(12) United States Patent
Hsu et al.

(10) Patent No.: US 12,196,406 B2
(45) Date of Patent: Jan. 14, 2025

(54) SUPPORT DEVICE AND BASE THEREOF

(71) Applicant: ASUSTEK COMPUTER INC., Taipei (TW)

(72) Inventors: Kai Chieh Hsu, Taipei (TW); Chih-Wei Chuang, Taipei (TW); Yaw-Huei Chiou, Taipei (TW); Peng Chao Wang, Taipei (TW); Po-An Tsai, Taipei (TW); Hao-Chun Lai, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 209 days.

(21) Appl. No.: 18/088,357

(22) Filed: Dec. 23, 2022

(65) Prior Publication Data

US 2024/0027061 A1 Jan. 25, 2024

(30) Foreign Application Priority Data

Jul. 20, 2022 (TW) .................................. 111127112

(51) Int. Cl.
*F21V 33/00* (2006.01)
*F16M 11/04* (2006.01)
(Continued)

(52) U.S. Cl.
CPC ......... *F21V 33/0052* (2013.01); *F16M 11/04* (2013.01); *F21V 3/049* (2013.01); *F16M 2200/08* (2013.01); *F21Y 2115/10* (2016.08)

(58) Field of Classification Search
CPC . H05K 5/02; H05K 7/16; F16M 11/06; F16M 11/04; F16M 11/22;
(Continued)

(56) References Cited

U.S. PATENT DOCUMENTS

| 9,907,194 B2 | 2/2018 | Chen et al. | |
| 2017/0188476 A1* | 6/2017 | Chen | ...................... F16M 11/06 |
| 2019/0063696 A1* | 2/2019 | Grandadam | ........... H05K 1/144 |

FOREIGN PATENT DOCUMENTS

| CN | 202452044 U | 9/2012 |
| CN | 204177998 U | 2/2015 |

(Continued)

*Primary Examiner* — Daniel C Puentes
*Assistant Examiner* — Peter Krim
(74) *Attorney, Agent, or Firm* — MUNCY, GEISSLER, OLDS & LOWE, P.C.

(57) ABSTRACT

A base is configured for a bracket. The base includes a hollow body, a plurality of supporting branches, and an illuminating module. The hollow body is connected to the bracket and has a bottom part and a first sidewall. The bottom part has an open hole. The first sidewall has a transparent structure. The plurality of supporting branches is disposed around the hollow body to lift the hollow body. The illuminating module is disposed in the hollow body and includes a sleeve and a base plate. The sleeve has a second sidewall, a first end, and a second end opposite to the first end. The second sidewall has an opening. The position of the opening is corresponding to the transparent structure. The base plate is disposed on the first end. The base plate is provided with a light source. The light source projects light beams toward the second end.

9 Claims, 5 Drawing Sheets

(51) Int. Cl.
*F21V 3/04* (2018.01)
*F21Y 115/10* (2016.01)

(58) Field of Classification Search
CPC . F16M 2200/08; F21V 33/00; F21V 33/0052; F21V 3/04; F21V 3/049; F21Y 2115/10; H04N 5/225; G06F 7/50; G06F 7/521; G06F 7/70; G06F 7/11; G06F 3/012; H01R 13/62
See application file for complete search history.

(56) References Cited

FOREIGN PATENT DOCUMENTS

| | | |
|---|---|---|
| CN | 106958731 B | 4/2019 |
| CN | 209340930 U | 9/2019 |
| TW | M521139 U | 5/2016 |

* cited by examiner

SUPPORT DEVICE AND BASE THEREOF

CROSS-REFERENCE TO RELATED APPLICATION

This application claims the priority benefit of Taiwan application serial No. 111127112, filed on Jul. 20, 2022. The entirety of the above-mentioned patent application is hereby incorporated by reference herein and made a part of the specification.

BACKGROUND OF THE INVENTION

Field of the Invention

The disclosure relates to a support device and a base thereof, and in particular, to a support device with a luminescent base.

Description of the Related Art

Displays are indispensable electronic devices in daily life and working environments. Generally, a display is provided with a support device to support a display device. To attract the attention of consumers, many manufacturers focus on the shape design of the display. However, the shape design of the display has its limitations. It is difficult to highlight the uniqueness of the product by seeking changes in only the shape design.

SUMMARY OF THE INVENTION

The disclosure provides a base, configured for a bracket. The base includes a hollow body, a plurality of supporting branches, and an illuminating module. The hollow body is connected to the bracket and is provided with a bottom part and a first sidewall, the bottom part is provided with an open hole, and the first sidewall is provided with a transparent structure. The plurality of supporting branches is disposed around the hollow body to lift the hollow body. The illuminating module is disposed in the hollow body and includes a sleeve and a base plate. The sleeve is provided with a second sidewall, a first end, and a second end opposite to the first end, where the second sidewall is provided with an opening, and the position of the opening is corresponding to the transparent structure. The base plate is disposed on the first end. The base plate is provided with a light source, and the light source projects light beams toward the second end.

The disclosure further provides a support device, configured to support a display device. The support device includes a base and a bracket. The bracket is provided with a first connecting end and a second connecting end, and the first connecting end is connected to the display device. The base includes a hollow body, a plurality of supporting branches, and an illuminating module. The hollow body is provided with a bottom part and a first sidewall, the bottom part is provided with an open hole, and the first sidewall is provided with a transparent structure. The plurality of supporting branches is disposed around the hollow body to lift the hollow body.

The illuminating module is disposed in the hollow body and includes a sleeve and a base plate. The sleeve is fixedly disposed in the hollow body and is connected to the second end. The sleeve is provided with a second sidewall, a first end, and a second end opposite to the first end, where the second sidewall is provided with an opening, and the position of the opening is corresponding to the transparent structure. The base plate is disposed on the first end. The base plate is provided with a light source, and the light source projects light beams toward the second end.

In conclusion, an illuminating module in a base of the disclosure penetrates an open hole of a bottom part of a hollow body to project light beams on a projection surface to generate a projected luminescence effect, and further penetrates an opening on a sleeve and a transparent structure of the hollow body to generate a luminescence effect of the side luminescence. In this way, the luminescence effects of both the projected luminescence and the side luminescence are presented to highlight the uniqueness of the product. In addition, in the disclosure, a single light source is configured to generate diversified luminescence effects, which also helps to save energy.

Specific embodiments adopted by the disclosure will be further illustrated through the following embodiments and drawings.

DETAILED DESCRIPTION OF THE EMBODIMENTS

The following will describe specific implementations of the disclosure in more detail with reference to drawings. According to the following description and scope of patent application, advantages and characteristics of the disclosure will be clearer. It should be noted that, drawings adopt a very simplified form and use a non-precise proportion, and are only used for conveniently and clearly illustrating embodiments of the disclosure.

Figure 1:
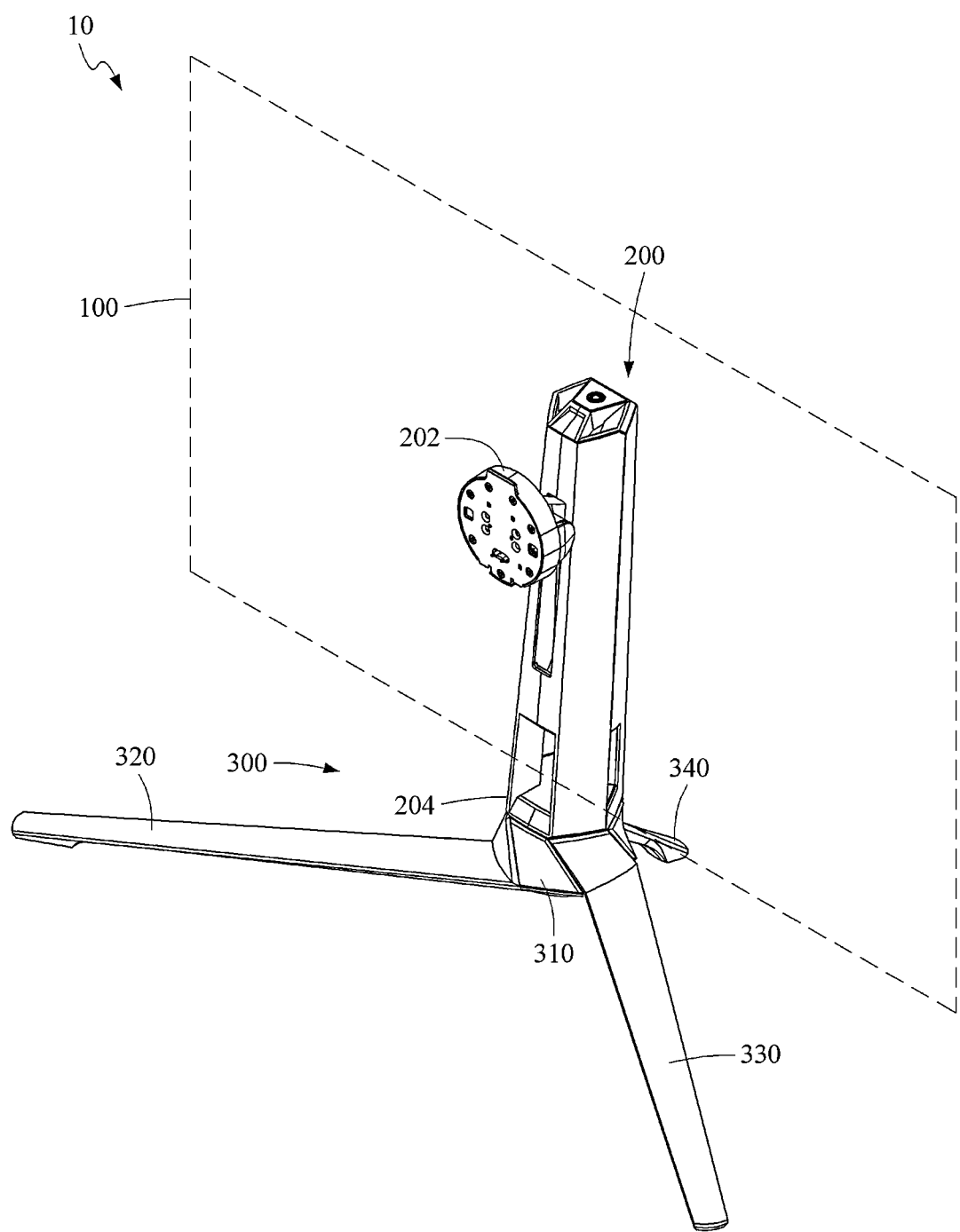
FIG. 1 is a schematic diagram of a support device provided in an embodiment of the disclosure.
Figure 2:
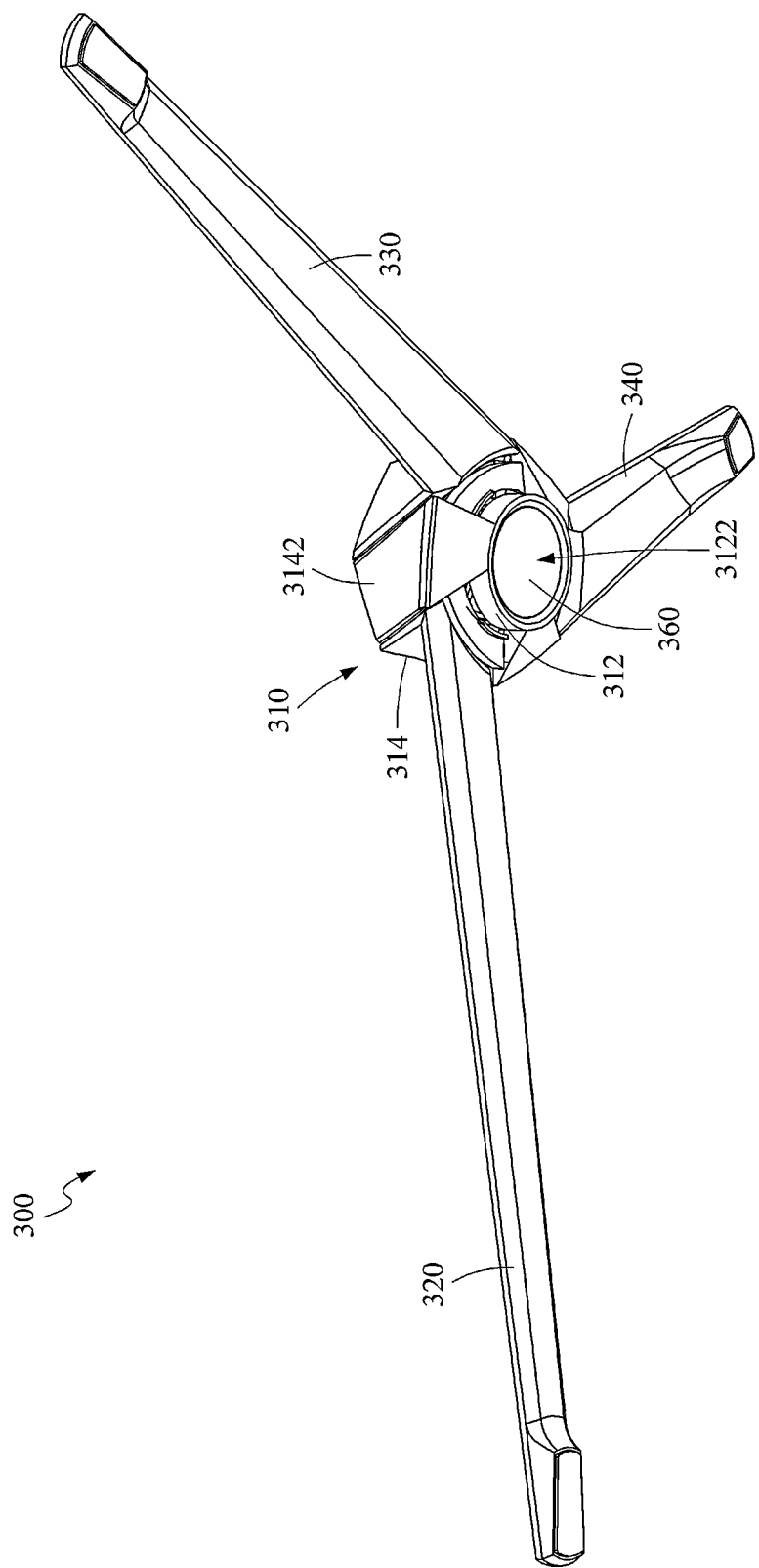
FIG. 2 is a schematic three-dimensional diagram of a base in FIG. 1.
Figure 3:
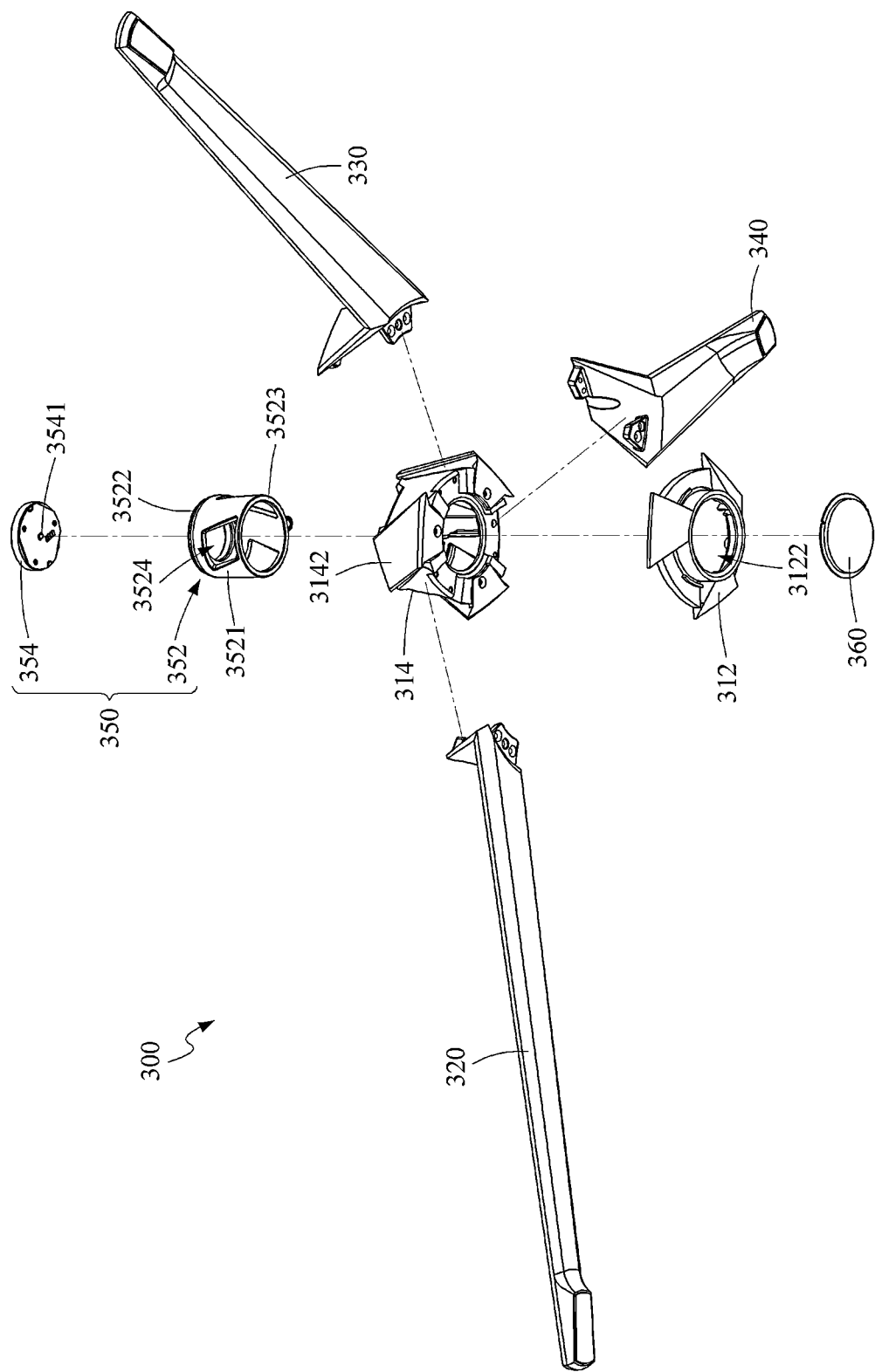
FIG. 3 is a schematic exploded view of the base in FIG. 1.
Figure 4:
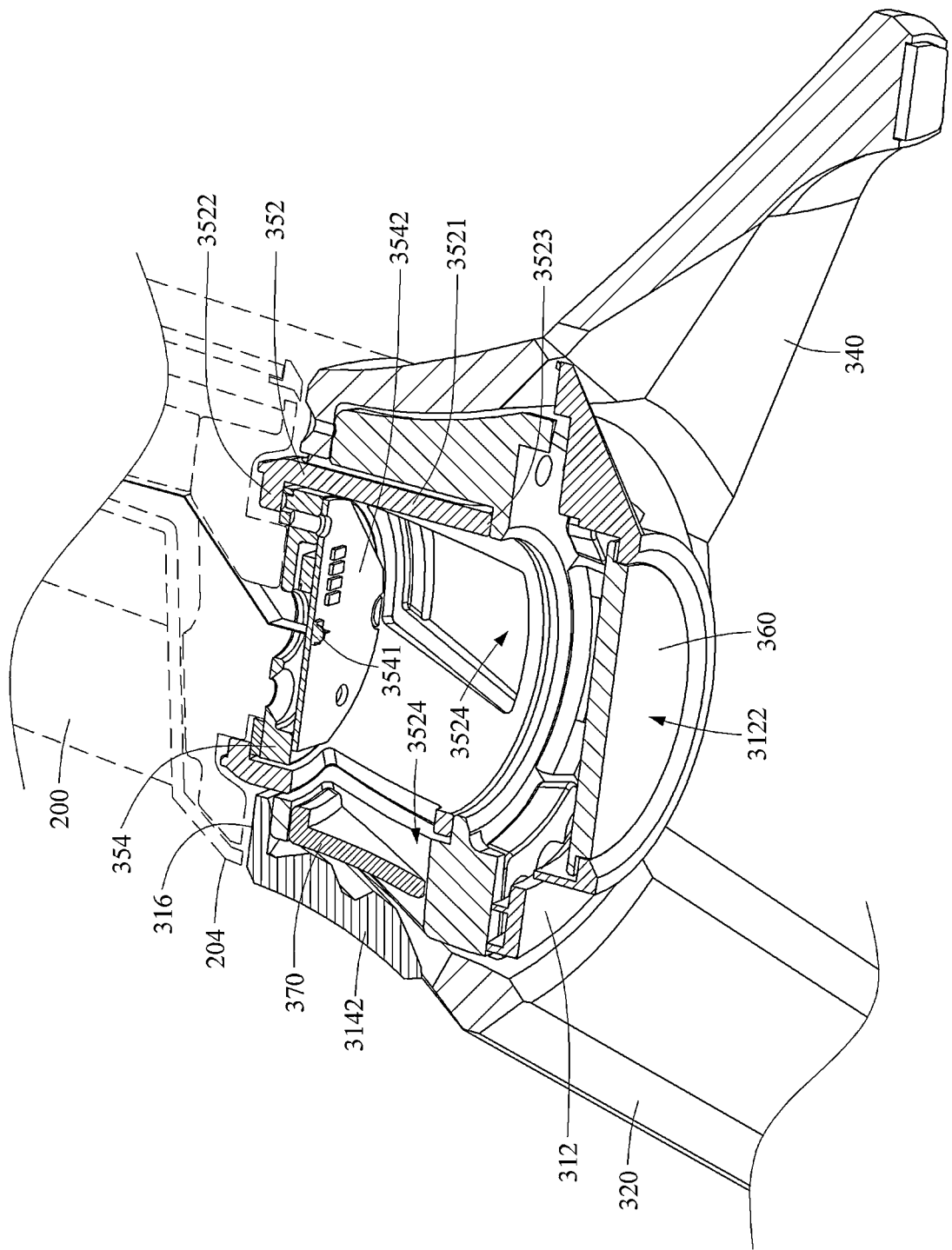
FIG. 4 is a cross-sectional view of the base in FIG. 1.

FIG. 1 is a schematic diagram of a support device 10 provided in an embodiment of the disclosure. The support device 10 is configured to support a display device 100. The display device 100 is a flat panel display, such as a liquid crystal display or an organic light-emitting diode display.

As shown in the drawing, the support device 10 includes a bracket 200 and a base 300.

The bracket 200 is provided with a first connecting end 202 and a second connecting end 204. The first connecting end 202 is connected to the display device 100 to support the display device 100 and provide power and display signals required for the operation of the display device 100. The second connecting end 204 is connected to the base 300.

Referring to FIG. 2 to FIG. 5, the base 300 includes a hollow body 310, three supporting branches 320, 330, and 340, and an illuminating module 350.

The hollow body 310 is provided with a bottom part 312 and a first sidewall 314. The bottom part 312 is provided with an open hole 3122, and the open hole 3122 is located in the center of the bottom part 312. In an embodiment, the base 300 further includes a transparent sheet 360 disposed in the open hole 3122. Light beams generated by the illuminating module 350 penetrate the transparent sheet 360, and then a luminescence pattern A1 is projected on a projection surface P1. In an embodiment, the projection surface P1 is a placement surface configured to place the support device 10.

In an embodiment, the transparent sheet 360 is provided with an opaque pattern or a semi-transparent pattern. The opaque pattern or the semi-transparent pattern is a logo, such as a trademark. Still, in an embodiment, the transparent sheet 360 is detachably disposed in the open hole 3122. A user changes the required transparent sheet 360 according to demands to present different luminescence patterns A1. In addition, if the user does not intend to present the luminescence pattern A1 on the projection surface P1, an opaque sheet (not shown in the drawings) is disposed in the open hole 3122 to shield the light beams generated by the illuminating module 350.

Figure 5:
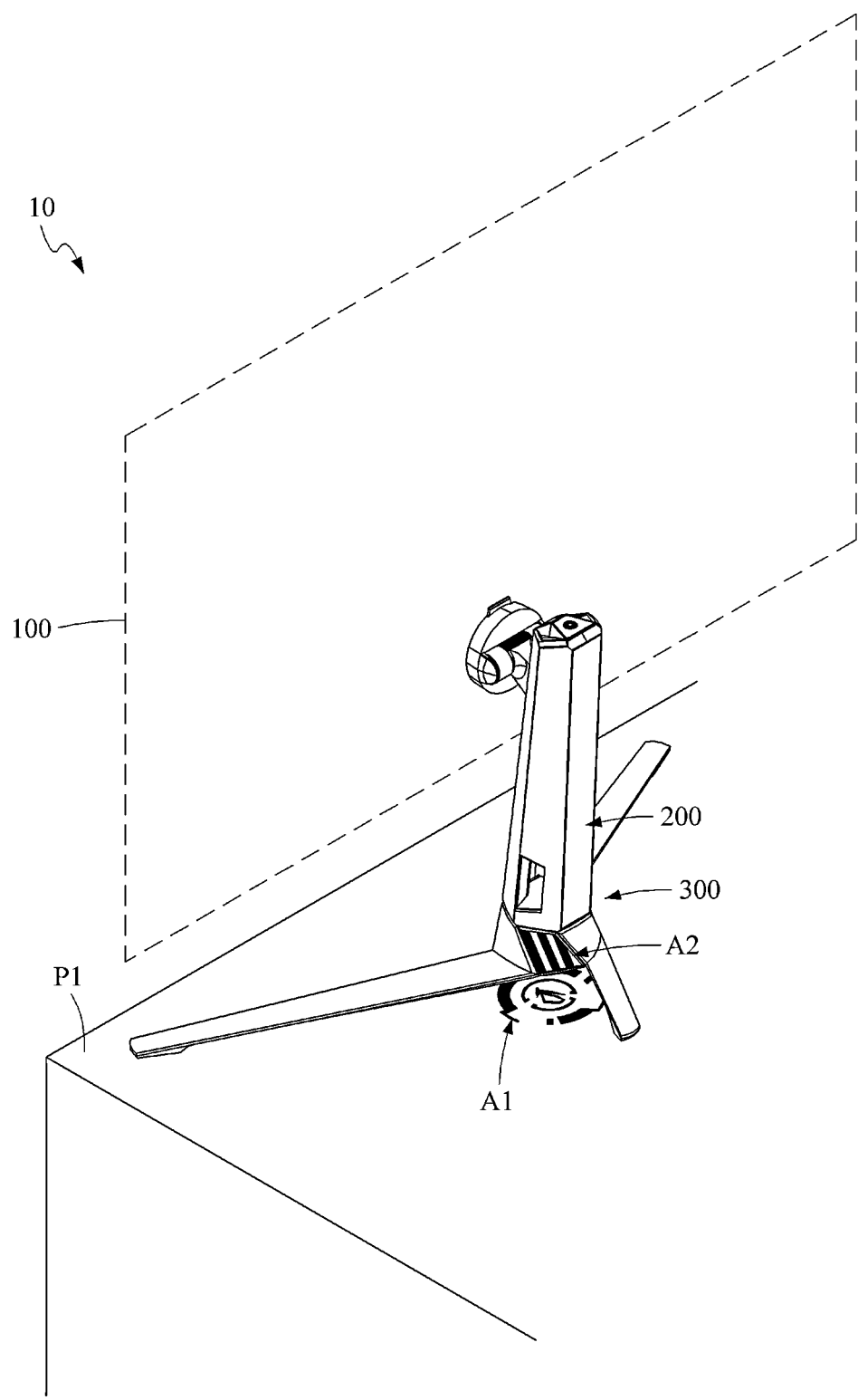
FIG. 5 is a schematic diagram of the support device in FIG. 1 projecting patterns.

The first sidewall 314 is provided with three transparent structures 3142. In an embodiment, the transparent structure 3142 is a transparent plate. A surface of the transparent plate is provided with a concavo-convex structure or form a specific pattern to present diversified luminescence effects of side luminescence. As shown in FIG. 5, the transparent structure 3142 is provided with a specific pattern, thereby presenting a special side luminescence pattern A2.

The three supporting branches 320, 330, and 340 are disposed around the hollow body 310 and are connected to the first sidewall 314 of the hollow body 310. The supporting branches 320, 330, and 340 lift the hollow body 310 to maintain a certain distance between the open hole 3122 and the projection surface P1, which is beneficial for generating the luminescence effect of the projected luminescence. In an embodiment, the supporting branches 320, 330, and 340 are connected to an opaque part of the first sidewall 314 between two adjacent transparent structures 3142, to prevent the transparent structures 3142 from affecting the connection strength between the supporting branches 320, 330, and 340, and the hollow body 310.

Specifically, the supporting branches 320, 330, and 340 include two relatively long supporting branches 320 and 330, and one relatively short supporting branch 340. The relatively long supporting branches 320 and 330 are corresponding to a left side and a right side of the support device 10 approximately, and the relatively short supporting branch 340 is corresponding to a rear side of the support device 10. In this way, the base 300 is prevented from occupying too much desktop space. In another embodiment, the three supporting branches 320, 330, and 340 have the same length and are disposed around the hollow body 310 at the same angle.

Next, in the base 300 in this embodiment, the three supporting branches 320, 330, and 340 are configured to lift the hollow body 310. According to actual design requirements, in another embodiment, the number of the supporting branches 320, 330, and 340 of the base 300 is four or more. In addition, the hollow body 310 in this embodiment is provided with the three transparent structures 3142, the number of which is the same as the number of the supporting branches 320, 330, and 340. According to actual design requirements, in another embodiment, the number of the transparent structures 3142 is less than the number of the supporting branches 320, 330, and 340, or greater than the number of the supporting branches 320, 330, and 340.

The illuminating module 350 includes a sleeve 352 and a base plate 354. The sleeve 352 is disposed in the hollow body 310 and is provided with a second sidewall 3521, a first end 3522, and a second end 3523 opposite to the first end 3522. The first end 3522 of the sleeve 352 is fixed to an upper edge 316 of the hollow body 310 in a snap-fit manner.

In an embodiment, the first end 3522 of the sleeve 352 further goes through the upper edge 316 of the hollow body 310, extends, and is connected to the second connecting end 204 of the bracket 200, to dispose the bracket 200 on the hollow body 310. In an embodiment, the second connecting end 204 of the bracket 200 is rotatably connected to the first end 3522 of the sleeve 352, thereby rotatably connecting the bracket 200 to the hollow body 310.

The second sidewall 3521 of the sleeve 352 is provided with three openings 3524, and the three openings 3524 are corresponding to the three transparent structures 3142 of the hollow body 310 respectively. The base plate 354 is disposed on the first end 3522 of the sleeve 352 and is provided with a light source 3541. The light source 3541 is located on a lower surface 3542 of the base plate 354 and projects light beams toward the second end 3523 of the sleeve 352. In an embodiment, the light source 3541 is a point light source, such as a light-emitting diode wafer, to provide large-angle illumination. In this way, the light beams generated by the light source 3541 are projected toward the second end 3523 and further projected toward the openings 3524.

In this embodiment, positions of the openings 3524 are aligned with the corresponding transparent structures 3142, and shapes of the openings 3524 are approximately the same as the corresponding transparent structures 3142, to ensure that the light beams generated by the light source 3541 effectively penetrate the openings 3524 and the transparent structures 3142 to generate the luminescence effect of the side luminescence.

In this embodiment, as shown in the drawings, the base 300 further includes an light-diffusing sheet 370. The light-diffusing sheet 370 is disposed between the opening 3524 of the sleeve 352 and the transparent structure 3142 of the first sidewall 314, and completely covers the transparent structure 3142 of the first sidewall 314. The light-diffusing sheet 370 improves the uniformity of the side luminescence, and further extends the range of the side luminescence, so that the luminescence range of the side luminescence is not limited by the position of the opening 3524.

Specifically, because the sleeve 352 is made of an opaque material, the light beams generated by the light source 3541 are only projected outward from the opening 3524 of the sleeve 352 or a lower end of the sleeve 352. If the light-diffusing sheet 370 extends to an area beyond the opening 3524, the luminescence range of the light beans generated by the light source 3541 extends to the area beyond the opening 3524, and it is not necessary to increase the size of the opening 3524.

In this embodiment, the opening 3524 is aligned with the transparent structure 3142 on the first sidewall 314, to ensure that the light beams generated by the light source 3541 penetrate the transparent structures 3142 and are projected outward. In another embodiment, the opening 3524 of the sleeve 352 and the transparent structure 3142 of the first sidewall 314 are disposed in misalignment, and then the light-diffusing sheet 370 is configured to guide the light beams from the opening 3524 to the transparent structure 3142 to be projected outward. In this way, the light beams generated by the light source 3541 are prevented from penetrating the opening 3524 and the transparent structure 3142 directly, and being projected onto the user's eyes to cause discomfort.

In an embodiment, the base 300 is additionally provided with a cover body. The cover body is movably disposed on an outer side of the hollow body 310 and is configured to selectively shield the transparent structure 3142 on the first sidewall 314. In this way, the user chooses whether to present the luminescence effect of the side luminescence according to the actual needs.

In conclusion, an illuminating module 350 in a base 300 of the disclosure penetrates an open hole 3122 of a bottom part 312 of a hollow body 310 to project light beams on a projection surface P1 to generate a projected luminescence effect, and further penetrates an opening 3524 on a sleeve 352 and a transparent structure 3142 of the hollow body 310 to generate a luminescence effect of side luminescence. In this way, the luminescence effects of both the projected luminescence and the side luminescence are presented to highlight the uniqueness of the product. In addition, in the disclosure, a single light source 3541 is configured to generate diversified luminescence effects, which also helps to save energy.

The above are only exemplary embodiments of the disclosure but do not limit the disclosure. Variations such as equivalent replacements or modifications in any form made by any person skilled in the art to the technical means and technical contents disclosed in the disclosure without departing from the technical means of the disclosure are contents not departing from the technical means of the disclosure and still fall within the protection scope of the disclosure.

What is claimed is:

1. A base, configured for a bracket, wherein the base comprises:
    a hollow body, connected to the bracket and provided with a bottom part and a first sidewall, wherein the bottom part is provided with an open hole, and the first sidewall is provided with a transparent structure;
    a plurality of supporting branches, disposed around the hollow body to lift the hollow body; and
    an illuminating module, disposed in the hollow body and comprising:
        a sleeve, provided with a second sidewall, a first end, and a second end opposite to the first end, wherein the second sidewall is provided with an opening, and the position of the opening is corresponding to the transparent structure; and
        a base plate, disposed on the first end, wherein the base plate is provided with a light source, and the light source projects light beams toward the second end.

2. The base according to claim 1, wherein the base further comprises a transparent sheet, the transparent sheet is disposed on the open hole, and the light beams generated by the light source penetrate the transparent sheet to present a luminescence pattern on a projection surface.

3. The base according to claim 1, wherein the light source is a light-emitting diode light source.

4. The base according to claim 1, wherein the base further comprises a light-diffusing sheet, and the light-diffusing sheet is disposed between the opening and the transparent structure.

5. The base according to claim 4, wherein the light-diffusing sheet covers the transparent structure completely.

6. The base according to claim 1, wherein the base further comprises a cover body, and the cover body is movably disposed on the hollow body to selectively shield the transparent structure.

7. The base according to claim 1, wherein the base further comprises a cover body, and the cover body is movably disposed on the bottom part to selectively shield the open hole.

8. The base according to claim 1, wherein the transparent structure is a transparent plate.

9. A support device, configured to support a display device, wherein the support device comprises:
    a bracket, provided with a first connecting end and a second connecting end, wherein the first connecting end is connected to the display device; and
    a base, connected to the second connecting end and comprising:
        a hollow body, provided with a bottom part and a first sidewall, wherein the bottom part is provided with an open hole, and the first sidewall is provided with a transparent structure;
        a plurality of supporting branches, disposed around the hollow body to lift the hollow body; and
        an illuminating module, disposed in the hollow body and comprising:
            a sleeve, provided with a second sidewall, a first end, and a second end opposite to the first end, wherein the second sidewall is provided with an opening, and the position of the opening is corresponding to the transparent structure; and
            a base plate, disposed on the first end, wherein the base plate is provided with a light source, and the light source projects light beams toward the second end.

* * * * *